UNITED STATES PATENT OFFICE.

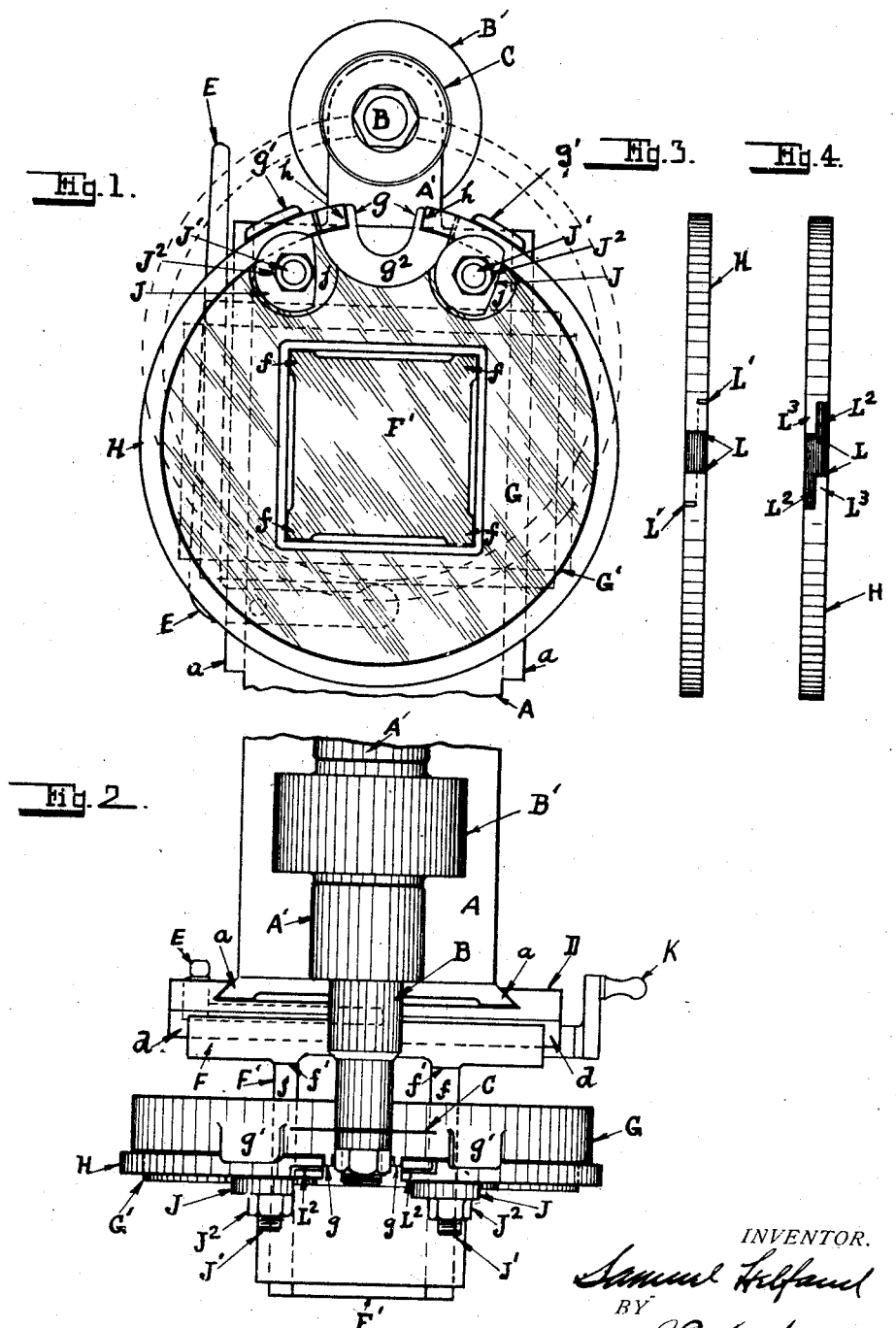

SAMUEL HELFAND, OF ERIE, PENNSYLVANIA.

PISTON-RING-SAW MACHINE.

1,365,101.  Specification of Letters Patent.  Patented Jan. 11, 1921.

Application filed January 21, 1920. Serial No. 353,052.

*To all whom it may concern:*

Be it known that I, SAMUEL HELFAND, a citizen of Russia, residing at Erie, in the county of Erie and State of Pennsylvania, have invented certain new and useful Improvements in Piston-Ring-Saw Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to the manufacture of piston rings, and consists in the construction of a machine adapted to clamp a piston ring in proper position to be engaged by a saw by means of which the overlapping joint is completed.

The features of my invention are hereinafter fully explained and pointed out and are illustrated in the accompanying drawings in which:

Figure 1, is a front view of a piston ring sawing machine embodying my invention.

Fig. 2, is a plan view of the same.

Fig. 3, is an edgewise view of a piston ring before being operated on by my machine.

Fig. 4, is a like view of a piston ring after being operated on by my machine.

In these drawings A indicates the pedestal of my machine, having on the upper end thereof journal bearings $A'$ in which is mounted a saw-arbor B provided with a pulley $B'$ and having a saw C secured thereon in the usual manner.

The pedestal A is provided with vertical dove-tailed flanges $a$ on which is slidably mounted a plate D, which plate D is adapted to be vertically moved by means of a lever E.

The plate D is provided with horizontal dove-tailed slide-ways $d$ on which is slidably mounted a plate F which is provided with a rectangular projection $F'$ which is provided with slides $f$ at the corners thereof, and slidably mounted on said slides $f$ is a work holding member G which is provided with an annular shoulder $G'$ adapted to receive a piston ring H thereon. This member G is provided with radial shoulders $g$, $g$, which are adapted to be engaged by the ends $h$ $h$ of a piston ring so as to properly position the ring on the shoulder $G'$. The member G is provided with ears $g'$ which are adapted to overlap the outer surface of the piston ring adjacent to the ends thereof so as to hold it down firmly upon the annular shoulder $G'$.

The annular shoulder $G'$ is provided with a depressed recess $g^2$ which is depressed sufficiently to receive the saw C thereinto when the work holding member is raised upwardly as hereinafter described, the bottom of said depression being substantially flush with the front surfaces of the radial shoulders $g$ $g$, so that the saw C will clear the same.

For the purpose of securing a piston ring on the work holding member G, I provide disks J J which are mounted on screw threaded stud-bolts $J'$, said disks being provided with shoulders $J^2$ adapted to receive a wrench by means of which the disks J can be clamped against a piston ring H. The disks J are preferably placed in depressions $j$ $j$ in the face of the member G so that they will engage the piston ring. The slide F is provided with a crank which operates a screw (not shown) for giving said slide transverse horizontal movement with relation to the saw-arbor B.

Pivoted on the pedestal A is a lever E, the lower end of which engages the under side of the slide plate D so that when the lever E is moved to the left, the slide plate D will be raised upward so as to raise the work holding member G upward so that a piston ring H secured thereon will be in the position indicated by broken lines in Fig. 1. The member G can be manually reciprocated on the slides $f$ $f$ on the projector $F'$ so as to position the work under the saw, or remove it from under the saw as shown in Fig. 2, when desired.

The slides $f$ are provided with suitable shoulders or stops $f'$ adapted to stop the member G at the proper position under the saw C.

The piston H, (see Fig. 3) has a short piece cut out as shown at L and then is provided with a radial slot $L'$ adjacent to each end thereof, on each side of the ring H. The ring is then placed on the work holding member G of my machine, as hereinbefore described, and the lever E operated to raise the work holder G upward so that the saw C will make the cuts $L^2$ as shown in Fig. 2 and Fig. 4, so as to leave projections L³ thereon as shown in Fig. 4, which are adapted to overlap each other when the ring is placed on a piston in an engine.

Having thus fully shown and described my invention so as to enable others to utilize the same, what I claim as new and desire to secure by Letters-Patent is:

1. In a machine of the class described, a slidable member, an annular shoulder thereon adapted to receive a piston ring, means thereon to engage the ends of a piston ring whereby said ends are positioned with relation to the axis of said annular shoulder, and clamp mechanism to maintain a piston in place on said shoulder, substantially as set forth.

2. In a machine of the class described, a slidable member, an annular shoulder thereon adapted to receive a piston ring, ears on said member to overlap the periphery of a piston ring adjacent to the ends thereof to hold it down upon said shoulder, and clamp means to maintain said ring on said shoulder, substantially as set forth.

In testimony whereof I affix my signature.

SAMUEL HELFAND.